United States Patent [19]

Holmes et al.

[11] 4,185,955
[45] Jan. 29, 1980

[54] APPARATUS FOR REPLICATING CENTRALLY APERTURED VIDEO DISC RECORDS

[75] Inventors: John R. Holmes, Garden Grove; Roy G. Jordan, El Toro, both of Calif.

[73] Assignee: MCA Disco-Vision, Inc., Los Angeles, Calif.

[21] Appl. No.: 918,894

[22] Filed: Jun. 26, 1978

Related U.S. Application Data

[62] Division of Ser. No. 847,367, Oct. 31, 1977.

[51] Int. Cl.² .......................... B29F 1/00; B29C 1/00; B29C 1/14
[52] U.S. Cl. ..................................... 425/542; 264/106; 264/328; 425/568; 425/810
[58] Field of Search ................ 425/542, 810, 571–573, 425/567–569; 249/105, 107; 264/106, 107

[56] References Cited

U.S. PATENT DOCUMENTS

3,989,436  11/1976  McNeely et al. ..................... 425/810
4,085,178   4/1978  McNeely et al. ..................... 425/810

*Primary Examiner*—W. E. Hoag
*Attorney, Agent, or Firm*—Ronald J. Clark

[57] ABSTRACT

Heated material is injected into an annular cavity, defined by a pair of mold halves, through a sprue passage, defined by a sprue bushing and an end portion of a punch. The annular cavity and the sprue passage form, respectively, the centrally apertured part and a sprue. After partial cooling of the heated material, the punch is locked in place while the annular cavity is displaced relative to the sprue passage so that the sprue is severed from the part along the peripheral surface of the punch end portion. The mold halves are separated to open the annular cavity while the sprue is resting on the punch end portion, and while the part is held by the punch end peripheral surface. After the mold halves are separated, a sprue ejector member is actuated to eject the sprue from the punch end portion. The finished video disc is then removed, carried by the moving platen of the moving mold assembly.

2 Claims, 14 Drawing Figures

4,185,955

APPARATUS FOR REPLICATING CENTRALLY APERTURED VIDEO DISC RECORDS

This is a Division of application Ser. No. 847,367, filed Oct. 31, 1977.

BACKGROUND OF THE INVENTION

Field of the Invention

This invention relates generally to a method and apparatus for molding a centrally apertured part; and more particularly concerns a method and apparatus for injection molding a centrally apertured and spirally tracked record, such as a video disc.

An apparatus for producing injection molded and centrally apertured video discs is shown in U.S. Pat. No. 3,989,436 issued Nov. 2, 1976.

BRIEF SUMMARY OF THE INVENTION

The invention is not only useful for injection molding centrally apertured video disc records, but is also applicable to the formation of injection molded records requiring an accurately positioned centrally placed aperture.

In certain video disc systems, video information is recorded in the form of light scattering or light reflecting members positioned in a spiral track on the surface of a centrally apertured record. For playback, the record is mounted on a rotatable turntable having a spindle which engages the record aperture for centering, and then relative motion is established between the record and a reading assembly. The reading assembly includes a laser optical system for generating a laser beam and for directing the laser beam to impinge upon a spiral track which contains the video information. The optical system includes an objective lens system which directs the laser beam to the spiral track and also collects the reflected signal from the spiral track for transmission to associated electronic circuitry which translates the detected reflections into signals suitable for a visual display by a standard home type television receiver. A system of the above-mentioned type is described in U.S. Pat. No. 3,829,622 issued to James E. Elliott and assigned to the Assignee of the present invention.

In such a video disc system, it has been recognized that, not only the average speed of relative motion between the impinging laser light beam and the record must be maintained at a predetermined speed of 1800 r.p.m., but the cyclical variations about the average speed must be limited for proper playback. It is desirable to reduce the cyclical speed variation to assure that the synchronizing pulses in the recovered television signal are fairly stable and within the lock-up range of the deflection circuits of the television receiver. The cyclical speed variations are particularly unpleasant when the recorded information is a color television signal.

One of the sources of cyclical speed variations is the record eccentricity. For proper playback of the video disc, it is important that the replicated record's center hole is concentric with the spiral groove center to a high degree of accuracy. As discussed in the aforementioned Elliott patent, the time base correction circuitry is useable to achieve correction for such cyclical speed variations to within the limits of the time base correcting circuits. More specifically, a time base correcting circuit has operating limits itself and can only correct for a certain amount of error. Therefore, it is preferred to form as perfect a video disc record as possible during the injection molding operation.

The concentricity between the center hole of the record and the record spiral track is particularly important when the spiral tracks are spaced a fraction of a micron from track center to track center, preferably one-half micron to one micron. The video disc member useable with the Elliott video disc player has light reflective and light scattering members positioned in track-like fashion on the information bearing surface of the video disc member. These light reflective or light scattering members are preferably sized to equal one-quarter of a wavelength of the incident light along the beam axis. More specifically, typical light scattering structures are more completely described in co-pending application of Manfred Jarsen, entitled "Replication Utilizing a Casting Process", Ser. No. 753,185 filed Dec. 22, 1976, and assigned to the Assignee of this invention.

In the Elliott system using a laser beam reflection system for reading the information tracks on the video disc, the video disc must be essentially birefringence free in the sense that it does not contain impurities embedded in the plastic material which give a false reflection or light scattering effect to the impinging laser beam. These impurities could include small particles of matter, left over from the previous injection cycle, being mixed with the new material needed in the present cycle. These impurities also induce stress forces formed within the plastic material during the injection cycle.

The concentricity of the finished molded video disc member is required to achieve faithful reproduction of the video information contained thereon. The center of gravity must be positioned within ten mils from the center of rotation of the video disc to limit the vibration due to static imbalance. The information tracks should be concentric with the center of rotation within one to two mils for good tracking and to fall within the time base correction capability of the electronic circuitry associated with the Elliott player. Concentricity of the information tracks with the center of rotation are achieved, in part, by providing a stamper member having means for allowing expansion of the stamper member within the video disc cavity in response to the heat associated with the injected plastic material. Concentricity can also be damaged during the sprue ejection or aperture punching steps. The aperture punching step must be performed without setting up a lateral shear force which inherently moves a portion of the video disc further towards or further away from the center of rotation during the punching operation.

It is an object of the present invention to provide a video disc record without flow lines and other surface defects in that portion of the record containing the spiral shaped information tracks.

It is a further object of the present invention to provide a video disc member having a substantially uniform value of birefringence over the entire surface of the video disc used for recording the video information tracks.

A still further object of the present invention is to provide a platen assembly having means for allowing the stamper structures to freely expand within predetermined limits in advance of the injected molten plastic material and the heat created therefrom.

Another object of the present invention is to provide an injection molding tool having cooling means for the platen subassembly.

The production of a video disc record having uniform values of birefringence over the entire information bearing surface of the video disc member is achieved in part; by employing holding means for allowing the video disc stamper members to expand under the application of heat caused by the injected molded material; by employing an annular shaped sprue passage intermediate the principal sprue passage and the video disc cavity to cause the molten material to flow into the disc cavity in a manner avoiding stress gradients within the injected material.

A first mold-half and a second mold-half are reciprocably mounted in the tool. A sprue bushing having an opening in communication with an injection nozzle is secured to the platen. A punch, having an end portion in registry with the sprue bushing, is reciprocably mounted relative to the second mold-half. When the second mold-half is in a closed location, (1) the punch end portion and the opening in the sprue bushing define a sprue passage, and (2) the first and the second mold halves define an annular cavity surrounding the sprue passage. The annular cavity and the sprue passage form, respectively, the centrally apertured part and the sprue when heated material is injected therein. After partial cooling of the heated injected material, the first and the second mold halves move from the closed location to a location intermediate of the closed location and an open location while the punch is locked in place to sever the sprue from the part along the peripheral surface of the punch end portion. The centering die locator and fixed center stamper clamp portion of the first mold half, where the punch end portion enters, serves as a die. The mold halves are thereafter separated to open the annular cavity while the sprue is resting on the punch end portion, and while the part is in contact with the punch end peripheral surface. After the mold halves are separated, a sprue ejector member and a part removal member are actuated to remove, respectively, the sprue and the part from the punch end portion.

An improved platen assembly is described having releasable means for centering the stamper and for holding the stamper in place against the platen surface. The holding means also includes means for allowing the stamper to expand under the temperature gradient of the heated plastic injected material. The stamper expands uniformly in front of the injected material, as the heated injected material fills the video disc cavity. The platen assembly further contains a plurality of separate cooling channels for maintaining the platen at a uniform temperature across the surface of the platen.

A center punch is described which accurately punches a hole in the center of the injected video disc member. The center punch is held stationary while the fixed mold half expanding base plate and the moving mold half move through the punch stroke to an intermediate position set by a punch stroke limiter device.

An annular shaped sprue passage is formed by the closing of the first and second mold half members and the end portion of the punch. The sprue passage comprises a first section defined by the sprue bushing itself and a second section defined by a combination of members including a portion of the sprue bushing, the end portion of the punch and portions of the inner centering locators and clamps.

The design of the second section of the sprue passage causes the injected material to advance into the video disc cavity with a plane wave front at constant pressure resulting in a video disc member of uniform thickness and minimum internal stress differentials. Such a video disc exhibits substantially uniform values of birefringence over the information bearing surface of the disc.

BRIEF DESCRIPTION OF THE SHOWN EMBODIMENT

Figure 1:
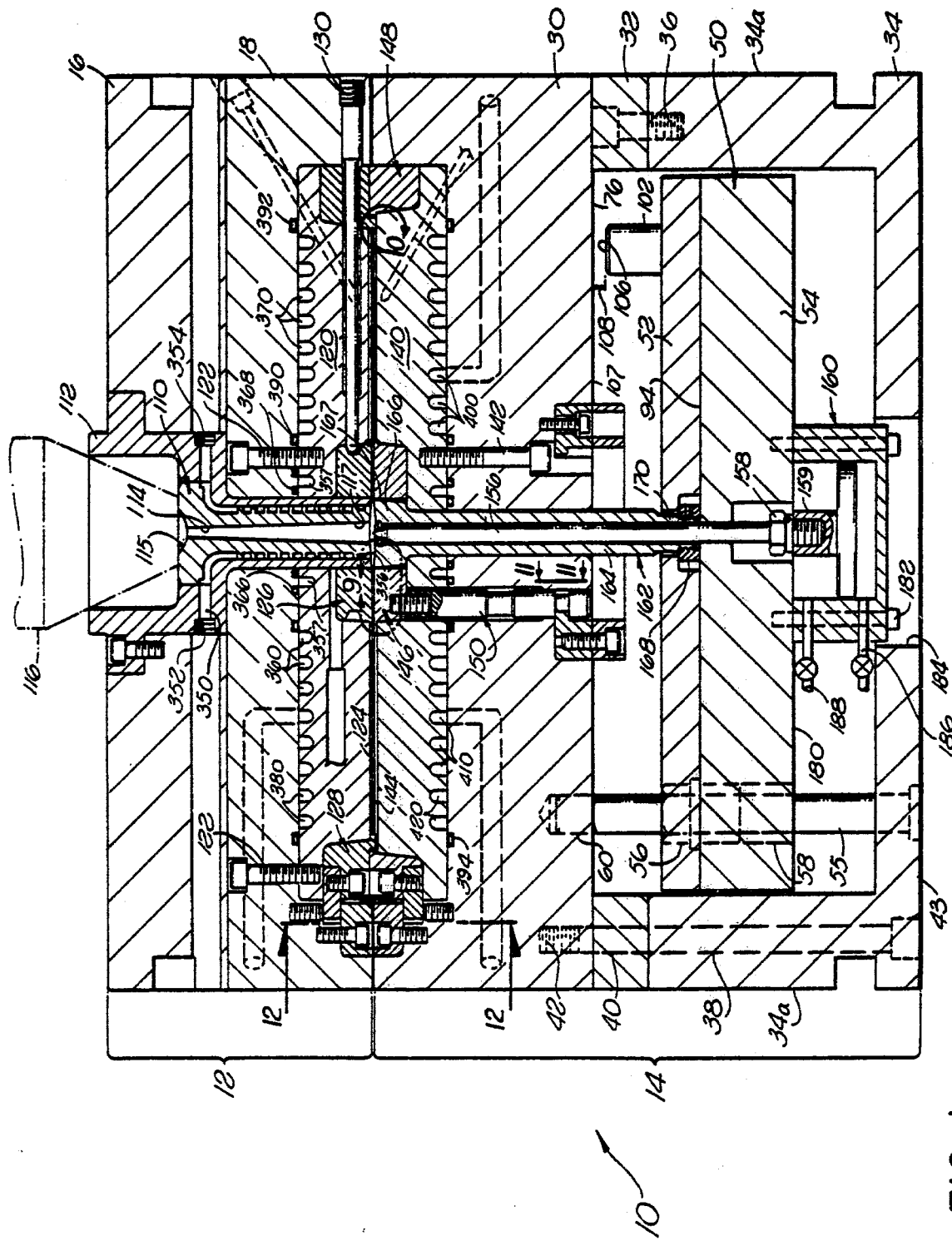
FIG. 1 is a cross-sectional view, partly schematic, taken along the line 1—1 of FIG. 7 of an injection molding apparatus for replicating centrally apertured and spirally tracked records pursuant to the principles of the present invention.
Figure 2:
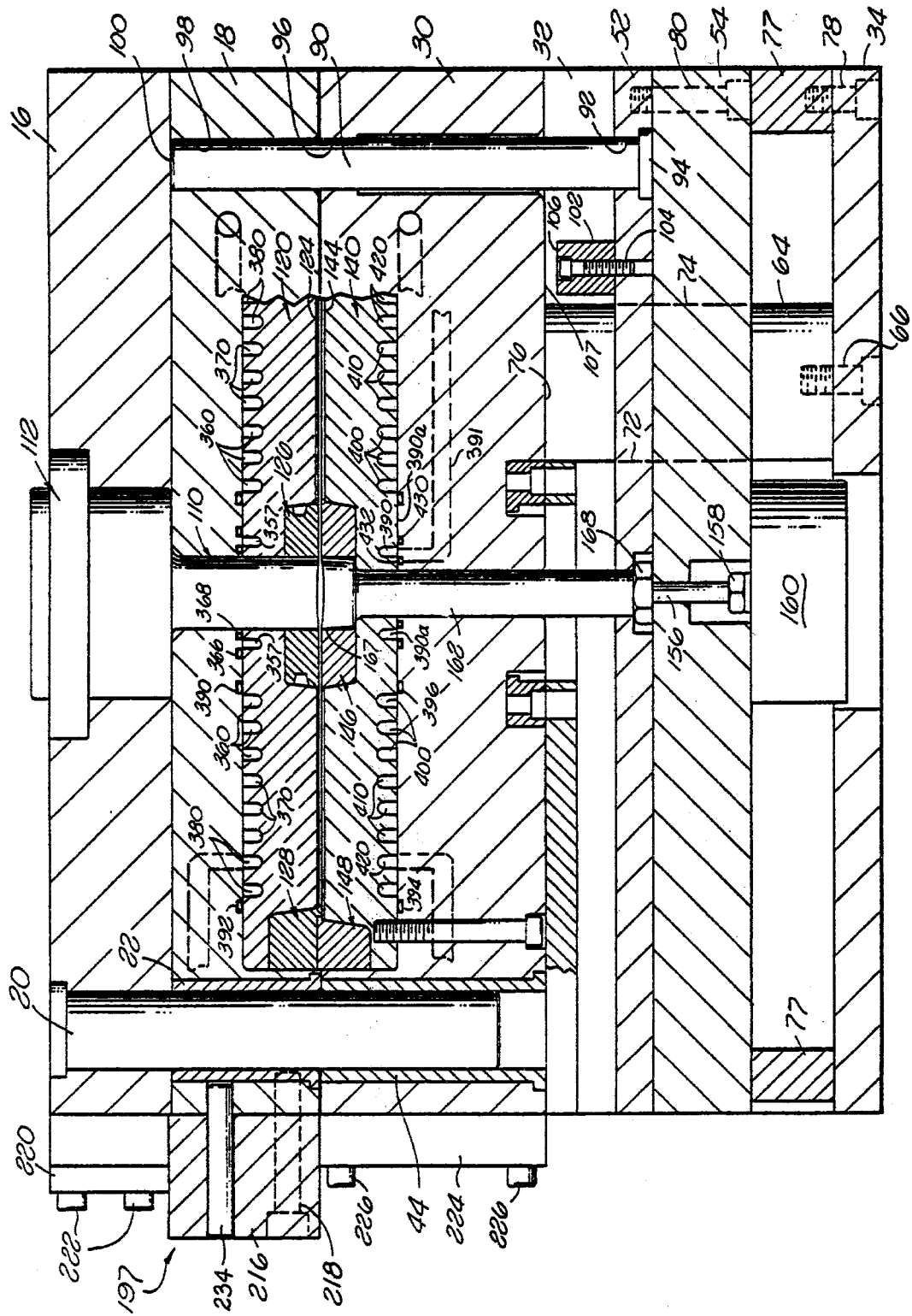
FIG. 2 is a cross-sectional view, similar to FIG. 1, taken along the line 2—2 of FIG. 7, of an injection molding apparatus for replicating centrally apertured and spirally tracked records pursuant to the principles of the present invention.

Referring to FIGS. 1 and 2, there is shown a tool 10 for use in combination with a standard injection molding machine, such as the 375 ton model manufactured by the Stokes Division of Penwalt Mfg. Co. The tool 10 is used for replicating a centrally apertured video disc record, and comprises a fixed mold half (first mold half) 12 and a moving mold half (second mold half) 14. The fixed mold half 14 comprises a fixed mold fixed base plate 16 which is attached to the fixed frame member of a standard molding machine (not shown) and a fixed mold half expanding base plate 18. The base plate 16 carries in integral attachment therewith a plurality of major guide and support pins, one of which is shown at 20. A fixed mold half major guide and support pin bushing is shown at 22 for reciprocally mounting the base plate 18 with the base plate 16 during the punching step. The punching step is defined in part by the reciprocal movement of the expanding base plate 18 with reference to the fixed base plate 16.

The moving mold half 14 comprises a moving mold half carrier plate 30, a moving mold half spacer plate 32 and a moving mold half fixed base plate 34. The moving mold half fixed base plate 34 is attached to the frame of a standard injection molding machine (not shown). The spacer plate 32 is attached to the fixed base plate 34 by a plurality of moving mold half spacer plate bolts, one of which is shown at 36. The bolts 36 are countersunk within the spacer plate 32 and are uniformly spaced around the periphery of the spacer plate 32 for firmly attaching it to the fixed base plate 34.

The base plate 34 is additionally attached to the carrier plate 30 by a plurality of moving mold half clamp bolts, one of which is shown at 38. Each of the clamp bolts 38 passes through the spacer plate 32 as indicated by the dotted lines at 40 and are threadably attached to the carrier plate 30 as indicated by the dotted lines shown at 42. The clamp bolts 38 are uniformly spaced about the periphery of the base plate to securely fasten together the carrier plate 30, the spacer plate 32 and the base plate 34. Each of the bolts 38 is countersunk within the base plate 34 to provide a smooth contact surface 43 to the plate 34.

A moving mold half major support pin bushing is shown at 44 carried by the carrier plate 30. The support pin 20 is positioned within the bushing 44 and provides reciprocal movement between the fixed mold half fixed base plate 16 and the carrier plate 30 during the punching operation. The support pin 20 also provides conjunctive movement between the fixed mold half expanding base plate 18 and the moving mold half carrier plate 30 during the punching operation. With the completion of the punching operation, the support pins 20 are fully withdrawn from the bushings 44 during the remaining portion of the opening step. At the fully opened position, the support pins are spaced from the moving stamper 144 to the same extent as the primary punch plate assembly stroke limiter 90 is shown spaced from the expanding base plate 18 in FIG. 5.

A punch plate assembly 50 comprises a punch plate assembly clamp plate 52 and a punch plate assembly support plate 54. The punch plate assembly 50 is carried within the moving mold half fixed base plate 34 and is reciprocally mounted therewith by a plurality of punch plate assembly guide pins integrally attached to the base plate 34. One of the punch plate assembly guide pins is shown at 55. A punch plate assembly clamp plate bushing is shown at 56 and a punch plate assembly support plate bushing is shown at 58. The guide pins 55 extend through the plates 52 and 54. The plates 52 and 54 are reciprocally mounted upon the pins 55 by the bushings 56 and 58, respectively.

The guide pins 55 extend into the moving mold half carrier plate 30, as shown by the dotted lines 60.

A plurality of moving mold half carrier support bars 64 are attached to the base plate 34 by individual bolts, one of which is shown at 66. The support bars 64 extend through openings in the plates 52 and 54 as indicated by the dotted lines at 72 and 74, respectively.

The support bars 64 provide added support to the back surface 76 of the carrier plate 30 during the injection of the molten material into the video disc cavity.

Referring to FIG. 2, a punch plate stop bar is shown at 77 positioned intermediate the punch plate assembly support plate 54 and the fixed base plate 34. The stop bar is attached to the base plate 34 by a plurality of punch plate stop bar bolts, one of which is shown at 78. The stop bar 77 is circular in cross section. A portion of the bar is shown at both the left and right hand portion of FIG. 2. The stop bar 77 adds rigidity to the tool allowing it to withstand the full force of the closing force of the main ram associated with the injection molding machine. In this capacity, it cooperates with the side members 34a of the fixed base plate 34 in withstanding the ram pressure during the closing and closed portion of the molding operation. While the stop bar 77 is described as circular in cross section, it can also be a single plate. If a single plate configuration is used, a number of such plates are disposed around the periphery of the base plate 34 so that the combined effect of the single member 77 is to uniformly separate the support plate 54 from the base plate 34.

The punch plate assembly support plate 54 is integrally attached to the punch plate assembly clamp plate 52 by a plurality of support plate to clamp plate bolts, one of which is shown at 80. Disassembly of the clamp plate 52 from the support plate 54 allows assembly of a plurality of primary punch plate assembly stroke limiters, one of which is shown at 90, to be positioned within an opening 92 carried by the clamp plate 52. Each primary stroke limiter rests at an interface 94 with the support plate 54. The stroke limiter 90 extends through openings 96 and 98 carried by the carrier plate 30 and the base plate 18. The stroke limiter is in engagement with the base plate 16 at an interface identified as 100.

A plurality of secondary punch plate assembly stroke limiters are carried by the punch plate assembly clamp plate 52. One of the stroke limiters is shown at 102 attached to the plate 52 by a bolt 104. In FIG. 1, an end surface 106 of the secondary punch plate assembly 102 is shown spaced from the under surface 107 of the carrier plate 30 by the distance indicated by a line 108. This distance 108 represents the distance to be traveled by the carrier plate 30 from the open position to the intermediate position, as described in greater detail with reference to FIGS. 4 and 5.

The fixed mold half fixed base plate 16 carries a sprue bushing at 110 held in place by a sprue bushing lock ring 112. The sprue bushing 110 has an opening 114 which communicates at one end 115 with an injection nozzle 116 of the injection molding machine and at another end 117 with the video disc cavity.

The fixed mold half expanding base plate 18 carries a fixed platen 120 attached thereto by a number of bolts, one of which is shown at 122. The fixed platen 120 carries a fixed stamper 124 held against the fixed platen 120 at its inner radius by a centering die locator and fixed center stamper clamp 126, and held at its outer radius by a fixed outer stamper ring clamp 128. The clamp 126 is held in place by a center clamp retaining bolt 130 which passes through the fixed mold half expanding base plate 18 and the fixed platen 120. The fixed outer stamper ring clamp is shown in greater detail in FIG. 10. The relationship between the fixed center stamper clamp 126 and the fixed stamper 124 is shown in greater detail with reference to FIG. 9.

The moving mold half carrier plate 30 carries a moving platen 140 attached thereto by a number of bolts, one of which is shown at 142. The moving platen 140 carries a moving stamper 144 held against the platen 140 at its inner radius by a centering punch locator and moving center stamper clamp 146 and at its outer radius by a moving outer stamper ring clamp 148.

Both outer ring clamps 128 and 148 can be effectively held in place by bolts countersunk in their respective platens 120 and 140 and extending through the platens into the rings 128 and 148. The bolts would provide a fixed connection while the configuration schematically shown to the left edge of the platens 120 and 140 provide a releasable connection.

The moving platen 140 is releasably attached to the moving mold half carrier plate 30 by a center clamp locking assembly 150. The assembly 150 can also comprise a number of bolts which would bolt the clamp 146 to the platen 140 rather than releasably attached the clamp 146 to the platen 140 as does the assembly 150. The bolts replacing the assembly 150 are countersunk within the carrier plate 30 in a manner similar to the positioning of the bolt 142.

Figure 5:
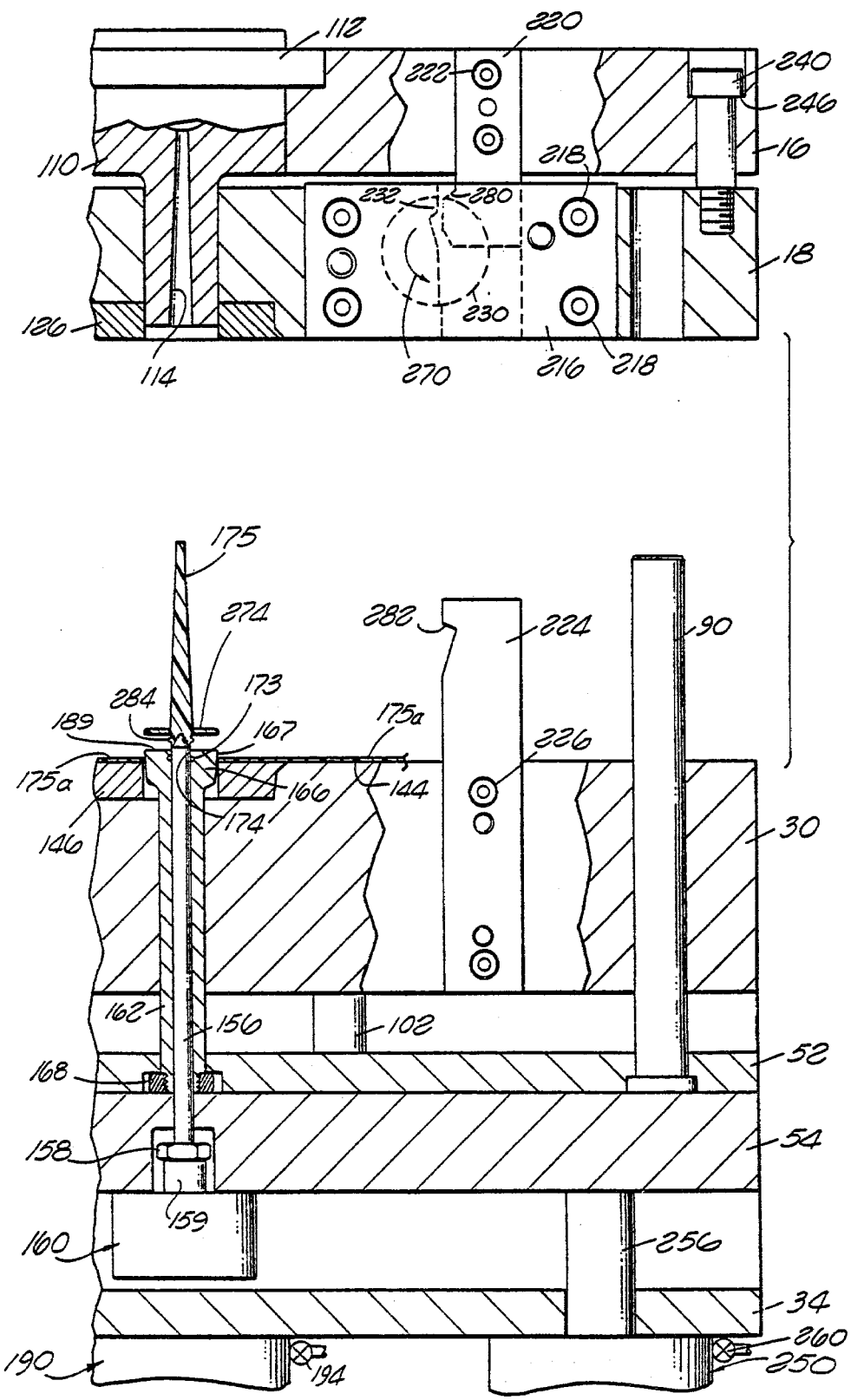

A sprue ejector pin 156 has a sprue ejector pin base nut 158 resting against a piston 159 of an air cylinder 160. A center hole punch 162 comprises a vertical center hole forming punch member 164 and a horizontal center hole forming punch member 166 having a punch end peripheral surface 167. A center hole punch adjusting nut 168 is attached to the bottom end 170 of the vertical punch member 164 and rests against the surface 94 of the punch plate assembly support plate 54. The horizontal punch member 166 of the center hole punch 162 carries an undercut 173, as best seen in FIG. 5, on an interior surface 174 which forms a portion of the sprue region. During injection of the molten plastic material, some sprue material fills the undercut region. During separation of the fixed mold half expanding base plate 18 from the moving mold half carrier plate 30, the plastic in the undercut region holds the sprue 175 to the punch 162. The centrally apertured part is shown at 175a.

The air cylinder 160 is bolted to a surface 180 of the assembly support plate 54 by bolts 182. As a design consideration, the cylinder 160 fits within an opening defined by a surface 184 carried by the base plate 34. An air intake passage into the cylinder 160 is schematically shown at 186 while an exhaust port is schematically shown at 188.

Referring generally to FIGS. 3 through 6, the operation of the injection mold apparatus is described. Schematic representations are shown illustrating basic movements provided by the standard injection molding machine, previously identified, which cooperates with the remaining elements of the tool 10 to provide the molding apparatus of the present invention. These basic steps form a portion of the method of the present invention and the basic machine elements which perform these movements also form a portion of the injection molding apparatus of the present invention. These basic movements and apparatus provided by and contained within a standard injection molding machine is schematically shown with reference to FIG. 3.

Figure 3:
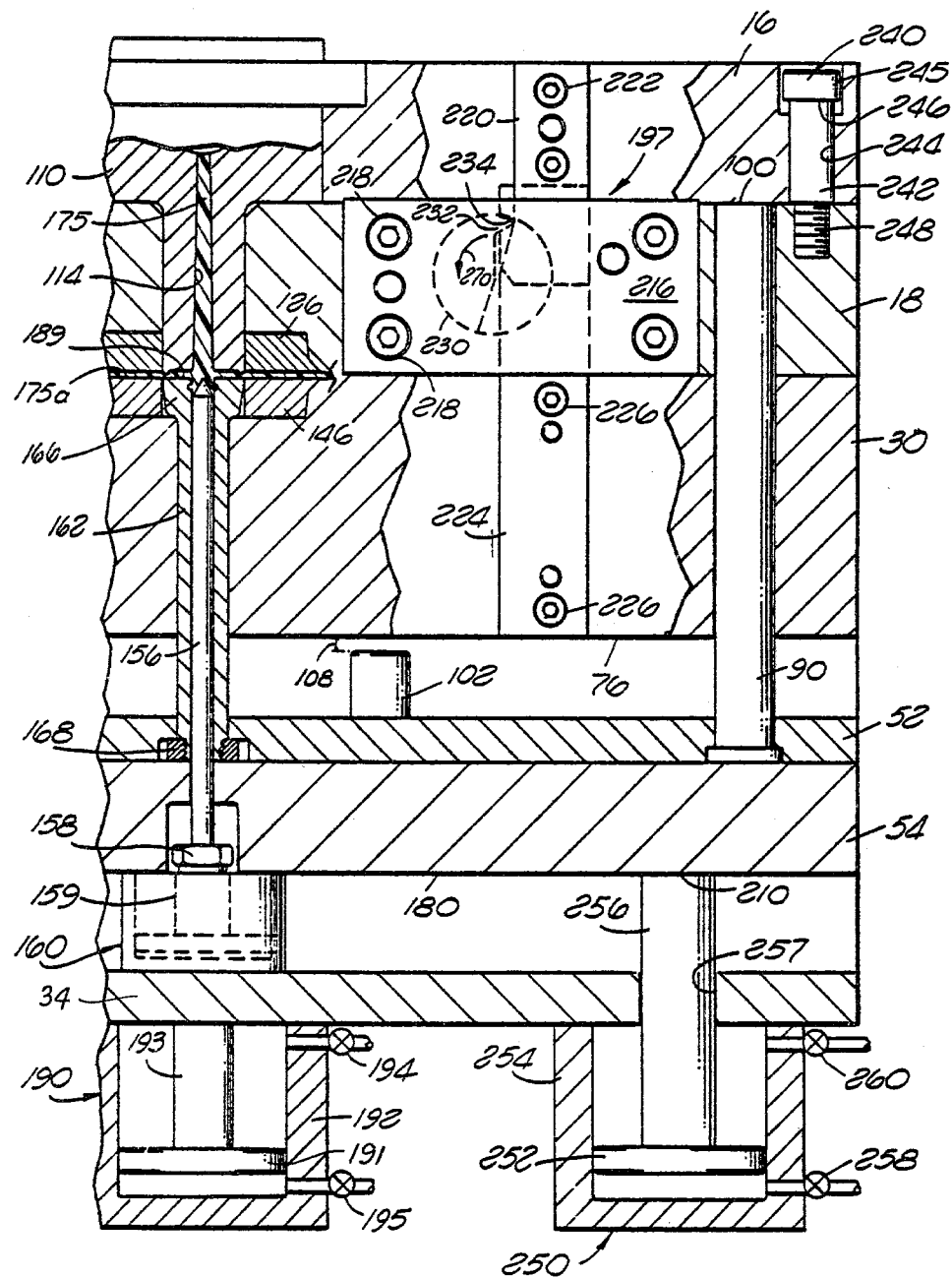
FIGS. 3 through 6 show in schematic form, the sequence of operation executed by the injection molding apparatus shown in FIGS. 1 and 2.

The injection molding apparatus is shown in the closed position in FIG. 3. This closed position is defined in part with the end surface 100 of the primary punch plate assembly stroke limiter 90 in contact with the fixed mold half fixed base plate 16. The secondary punch plate assembly stroke limiter 102 is spaced a distance 108 from the surface 76 of the moving mold half carrier plate 30. The ejector pin 156 is in its retracted position. The horizontal portion 166 of the punch assembly 162 is in its retracted position. An end surface 189 of the punch assembly 162 and the opening 114 of the sprue bushing 110 defines the sprue passage. The first and second mold halves define an annular cavity surrounding the sprue passage. The annular cavity and the sprue passage form, respectively, a centrally apertured part 175a and a sprue 175 when heated material is injected therein.

Figure 6:
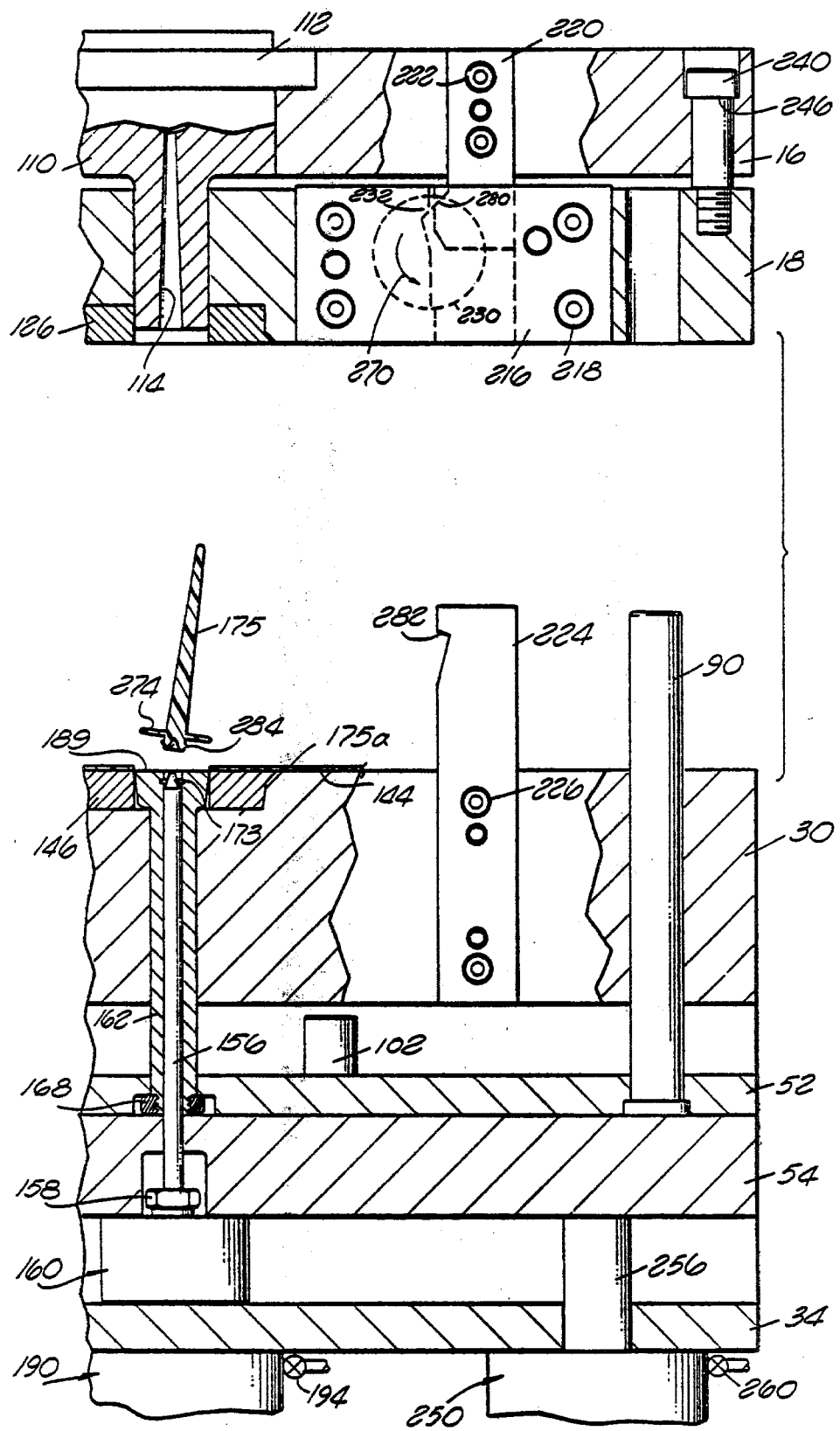

A first selectively actuated means 190 causes motion of the second mold half 14 between a closed location (FIGS. 1 and 3) and the open locations (FIG. 5 and 6). The first selectively actuated means comprises a piston 191 riding in a cylinder 192. A connecting rod 193 connects the piston 191 to the base plate 34. Pressurized fluid is admitted into the cylinder 192 through a fluid valve 194 to move the second mold half 14 from the closed location (FIGS. 1 and 3) to the open location (FIGS. 5 and 6). Pressurized fluid is admitted into the cylinder 192 through a fluid valve 195 to move the second mold half 14 from the open location (FIGS. 5 and 6) to the closed location (FIGS. 1 and 3).

When the first and the second mold halves 12 and 14 are in the closed location (FIGS. 1 and 3, (a) an end portion 189 of the punch 162 and the sprue bushing opening 114 define a sprue passage and (b) the first and second mold halves define an annular cavity surrounding the sprue passage. The annular cavity and the sprue passage form, respectively, a centrally apertured part 175a and a sprue 175 when heated material is injected therein.

A second selectively actuated means causes motion of the first mold half 12 with the second mold half 14 in response to the motion of the second mold half from the closed location (FIGS. 1 and 3) to a location which is intermediate (FIG. 4) of the closed location and an open location (FIGS. 5 and 6) whereby the annular cavity remains closed while the first and second mold halves move from the closed location to the intermediate location. The second selectively actuated means comprises a latching means 197 comprising a fixed base plate 216 attached to the fixed mold half expanding base plate 18 by a plurality of bolts 218. A first latch member 220 is bolted to the fixed mold half fixed base plate 16 by a plurality of bolts 222. A second latch member 224 is bolted to the moving mold half carrier plate 30 by a plurality of bolts 226. While this latch is a standard latch, its mode of operation has been specifically incorporated into the present invention and as such it represents an integral operating mechanism within the inventive combination. This latch mechanism is a standard commercially available latch identified as the "jiffy latch".

Briefly stated, the method of operation of the latch centers around a horizontal disposed pivoting latch member 230 having a pivot pin 232 having a surface 234 which engages latching surfaces carried by each latch member 220 and 224. In the views, it shows the surface 234 and the latching surfaces of the members 220 and 224 are all represented by the line 234 since all these members are shown from the top view. The length of the pivot pin indicated by the length of the line 234 represents the extent to which the first latch member 220 can move away from and with relation to the second latch member 224, while the latch remains in the latched condition. This distance is represented by the length of the line 235 shown in FIG. 4. The latching means 197 functions to hold the fixed mold half expanding base plate 18 against the moving mold half carrier plate 30 while both last identified members move a distance indicated by the length of the line 235 shown in FIG. 4.

Figure 4:
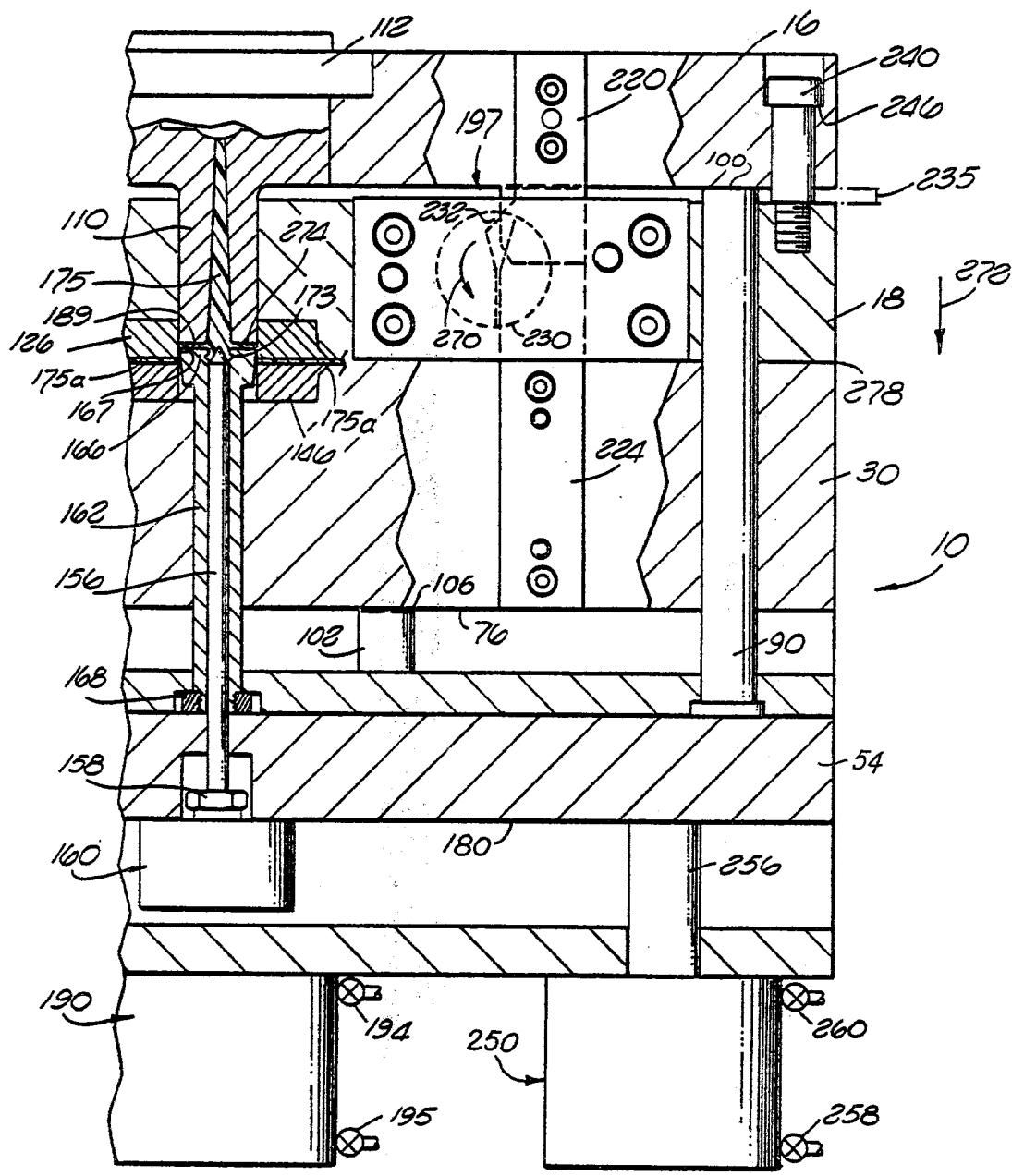

FIG. 4 shows the pivot pin 232 in its fully extended position at the instant the first latch member 220 has moved the full distance with relation to the second latch member 224. The latch mechanism 197 keeps the annular cavity closed while the first and second mold halves move from the closed location to the intermediate location.

Referring back to FIG. 3, an expanding base stroke limiter comprises a plurality of bolts, one of which is shown at 240. The bolt 240 has a shank portion 242 fitting within an opening 244 carried by the fixed mold half fixed base plate 16. A head member 245, carrying a shoulder 246, is integrally connected to the shank member 242. The stroke limiter 240 is threadingly engaged with the expanding base plate 18 as shown at 248. A plurality of such stroke limiters 240 are provided around the periphery of the base plate 16 and function to limit the movement to the fixed base plate 16 with relation to the expanding base plate 18 during the rotation of the pivot latch member 230 during the movement of the tool from its closed position shown in FIG. 3 to its intermediate position shown within FIG. 4.

Third selectively actuated means 250 locks the punch assembly 50 in place while the first and second mold halves 12 and 14 move from the closed location (FIGS. 1 and 3) to the intermediate location (FIG. 4), at which position the sprue 175 is fully severed from the part 175a by the peripheral surface 167 of the punch end portion 166. A portion of the sprue bushing where the punch end portion 166 enters serves as a die. Third selectively actuated means 250 comprises a piston 252 riding in a cylinder 254. A connecting rod 256 connects the piston 252 to the punch plate assembly support plate 54 through an opening in the base plate 34 defined by a surface 257. Pressurized fluid or air is admitted to the cylinder 254 through valve 258 to lock the punch plate assembly support plate 54 in contact with the base plate 16 at interface 100 while the first and second mold halves 12 and 14 move from the closed location (FIGS. 1 and 3) to the intermediate location (FIG. 4). After the second mold half 14 reaches the intermediate location (FIG. 4), the punch plate assembly support plate 54 moves in conjunction with the second mold half 14 from the intermediate location (FIG. 4) to the open location (FIGS. 5 and 6). This is accomplished by opening the valve at 258 and thus reducing the pressure holding piston 252 against the punch plate assembly support plate 54 alone or in conjunction with the admission of pressurized fluid or air through valve 260 to drive piston 252 back to its retracted position.

Referring to FIG. 4, the tool 10 is in its intermediate position. The intermediate position is defined, in part, as that position wherein the shoulder 246 of the expanding base stroke limiter 240 is in contact with the fixed mold half fixed base plate 16 at the interface identified as 246. The first latch member 220 has retracted from the second latch member 224 by a distance indicated by the line 235 and the pivot pin 232 has rotated in the direction indicated by an arrowhead 270 to its maximum latched position just prior to opening. The connecting rod 256 of the third selectively actuated means 250 bears against the surface 180 of the punch plate assembly support plate 54 maintaining contact of the primary punch plate assembly stroke limiter 90 with the fixed mold half fixed base plate 16 at the interface 100. With the third selectively actuated means 250 maintaining contact of the limiter 90 with the base plate 16 and holding the punch assembly 162 stationary with relation to the sprue bushing 110, the fixed mold half expanding base plate 18 and the moving mold half carrier plate 30 move in the direction indicated by an arrow 272 under the admission of fluid by the valve 194 into the cyliner 192 of the first actuated means 190. A punching action occurs between the horizontal portion 166 of the punch 162 and the centering die locator and fixed center stamper clamp 126 for severing the sprue 175 from the part 175a. An annular disposed portion 274 of the part 175a remains attached to the sprue 175. The portion 274 is that part positioned between and in contact with the end surface 189 of the punch 162 and the end surface 299 of the sprue bushing 110. The sprue 175 is held by its undercut 173 to the punch end surface 189 and the part 175a is resting on the punch end peripheral surface 167. It should be noted at this point that the main parting line indicated at 278 between the expanding base plate 18 and the carrier plate 30 illustrates that the two plates are still firmly held together by the second selectively actuated means 197.

When the combined movement of the expanding base plate 18 and the carrier plate 30 is such that surface 76 of the carrier plate 30 contacts surface 106 of the secondary punch plate stroke limiter 102, and when surface 246 of the stroke limiter 240 contacts fixed base plate 16, the latching means 197 opens. The expanding base stroke limiter 240 stops the movement of the base plate 16. The actuating means continues to open the cavity by continuing movement of the second mold half 14 including the punch assembly 50 to the open position shown in FIG. 5.

FIG. 5 shows the mold injection tool 10 in its open position. In the open position the shoulder 246 of the expanding base stroke limiter 240 is in contact with the fixed mold half fixed base plate 16 at the interface identified by numeral 246. The primary punch plate stroke limiter 90 is fully withdrawn from the base plate 18. The latching member 230 is fully rotated in the direction indicated by the arrow 270 such that the pivot pin 232 is disengaged from both the upper latch member 220 and the lower latch member 214. A latching surface 280 of the first latch member 220 is shown in its disengaged position from the pivot pin 232. A latching surface 282 of the second latching member 224 is shown in its disengaged position from the latching surface 234 of the latching means 197. The sprue 175 is attached to the end of the ejector pin 156 and carries an annular protuberance at 284 which corresponds to the undercut 173. During the injection of the molten material into the sprue passage and the annular cavity, the protuberance 284 was formed in the undercut 173.

The piston 159 of the air cylinder 160 is shown in its extended position whereby the ejector pin is moved forward carrying the sprue 175 and its annular part 274 free of the end 189 of the punch 162. The piston 159 is caused to move its forward position by admission of pressurized fluid through the valve 186.

With the sprue 175 separated from the part 175a, the next function to be performed is the removal of the sprue from the end of the ejector pin 156.

Referring to FIG. 6, the tool 10 is shown in the fully open position and the ejector pin 156 is shown in its retracted position. The retracted position is caused by the admission of fluid into the valve 188 for moving the piston to its second retracted position as shown in FIG. 6. In the movement of the ejector pin 156 back to its retracted position in the direction as shown by the arrow 286, the protuberance at 284 engages the surface 189 of the punch for separating the sprue from the ejector pin 156 as shown in FIG. 6.

Figure 9:
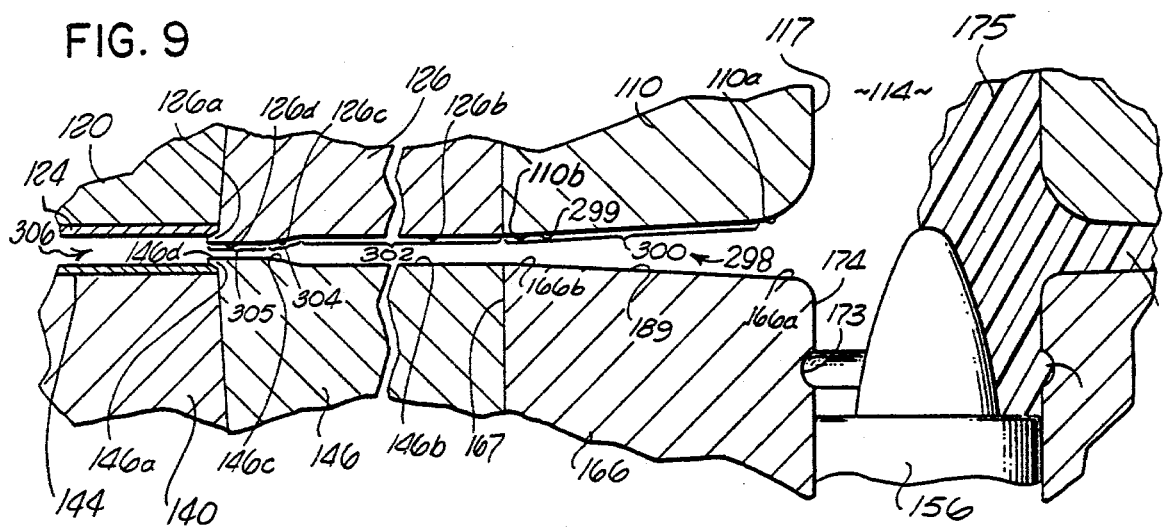
FIG. 9 is an enlarged sectional view taken within the circle identified as 9 and as shown in FIG. 1.

Referring to FIG. 9, there is shown an expanded view of that portion of FIG. 1 shown within circle 9. The fixed platen is shown at 120 having the fixed stamper 124 held thereto by a finger 126a of the centering die and fixed center stamper clamp 126.

The moving platen is shown at 140 having the moving stamper 144 held thereto by a finger 146a of the centering punch locator and moving center stamper clamp 146. The sprue bushing 110 is shown having its lower end 117 positioned in proximity to the ejector pin 156. The horizontal punch member 166 is shown having the undercut 173 positioned in the inner surface 174. Assuming that the cavity defined by the members just above described is filled with hardened plastic material injected during the injection cycle of the injection molding machine, the sprue is shown at 175, the annular portion 274 is shown attached integrally formed with the sprue 175. The protuberance 284 is also shown in integral formation with the sprue 175.

It has been found that the design of the sprue passage, including an annular shaped gate passage 298 positioned intermediate the sprue opening 114 and a video disc cavity 306 formed between stampers 124 and 144, should possess a configuration such that the injected material advances across the stamper surface at a uniform rate. In order to achieve this desired effect, the annular shaped gate passage 298 assumes a unique form comprising a plurality of annularly shaped passage sections and each section has an entry region and an exit region. The exit region of one section corresponds to the entry passage of the following section.

The first annular section is formed between an end surface 299 of the sprue bushing 110 and an end surface 189 of the punch 166 as indicated by the bracket 300. Each of the surfaces 299 and 189 lie at an angle of three percent with the horizontal. Surface 299 lies three percent above the horizontal and line 189 lies three percent below the horizontal. The entry region of this first section 300 is at 110a. The exit section is at 110b. The distance between surfaces 299 and 189 at the exit region equals the thickness of the cavity 306. By observation, the entrance section between 110a and 166a is thicker than the exit region between points 110b and 166b. This means that a pressure differential exists between regions 110a and 110b.

A second annular section is formed by a portion of the surface 126b and a portion of a surface 146b of the fixed center stamper clamp 126 and the moving center stamper clamp 146. This second region is indicated by a bracket 302. The surfaces 126b and 146b are spaced apart a distance equal to the thickness of the video disc cavity 306 and are coextensive over their entire length.

A third annular section of the annularly shaped gate passage 298 comprises relatively short portions 126c and 146c of the fixed center stamper clamp 126 and the moving center stamper clamp 146, respectively as indicated by the bracket 304. The entrance region of the third annular section equals the thickness of the video disc cavity 306 and the exit region is considerably smaller than the entrance region.

A fourth annular section of the annularly shaped gate passage 298 is formed by a portion 126d and 146d of the fixed center stamper clamp 126 and the moving center stamper clamp 146 as indicated by bracket 305. The exit section of the fourth annular section is an entry nozzle into the video disc cavity 306.

In operation, the hot material to be injected into the video disc cavity for forming the video disc record enters the sprue passage 114 as a hot melt and then spreads out circumferentially around the sprue passage 114 into the annularly shaped gate passage 298 and finally into the video disc cavity 306 until it reaches the outside dimensions of the cavity as more fully discussed with reference to FIG. 10. The machine is held in a quiescence position until the molten plastic solidifies to a certain temperature as is more completely discussed with reference to FIGS. 7 and 8. During the previously described injection cycle, the hot melt enters the entrance region of passage 298 at a greater rate than it can exit the same passage 298 through the section identified by the bracket 305 because the exit aperture from the fourth annular section 305 is necked down relative to the entrance section at the first annular section 300. The third annular section 304 acts as a partial restrictor to the flow of molten material. The first and second sections 300 and 302 act as a pressure reservoir and distribution header for the flow of material to insure that an even flow of molten plastic flows into the video disc 306 with minimum disturbance to material flow. This control of the molten material through the restrictor section 304 provides the added advantage of making very round video disc records with information tracks on the video disc records which closely approximated perfect circles. This control in formation of both the round video disc records and the tracks closely approximating perfect circles would not be available if the annular gate passage were not used.

Figure 13:
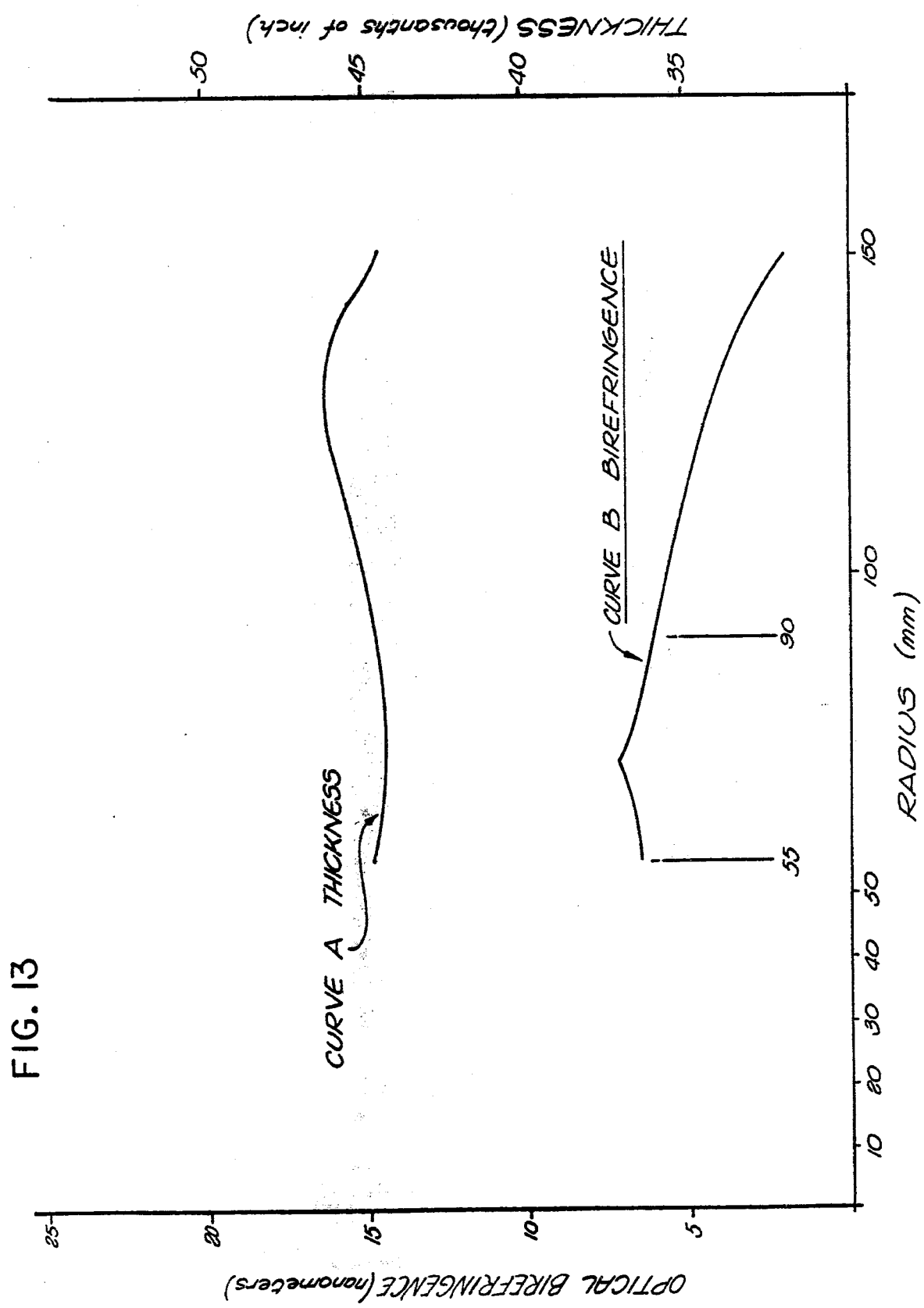
FIG. 13 is a graph showing a changing relationship in value of birefringence accompanying a changing relationship in the thickness of an acceptable video disc.

Referring to FIG. 13, there is shown a graph showing the relationship between the thickness of an acceptable video disc and the birefringence at a radius from the center of the sprue passage. Curve A of FIG. 13 shows a variation in thickness of plus or minus two thousandths of an inch from a nominal value of forty-four thousandths of an inch over the information carrying portion of the video disc surface. Curve B shows the change in birefringence over the same region of the disc surface. The change in birefringence is from two nanometers to seven nanometers.

Figure 14:
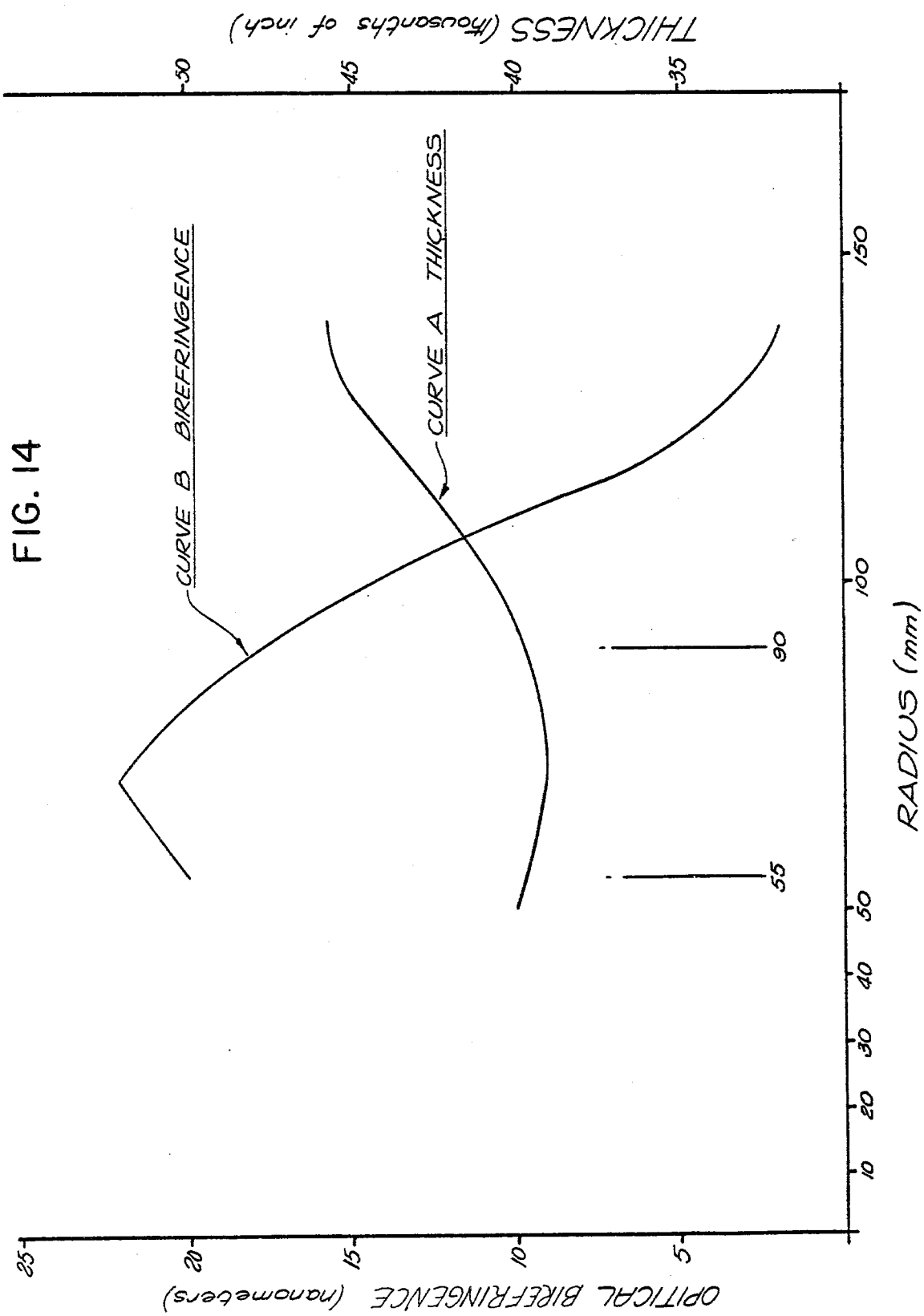
FIG. 14 is a graph showing a changing relationship in value of birefringence accompanying a changing relationship in the thickness of an unacceptable vide disc.

Referring to FIG. 14, curve A shows the relationship between birefringence of an unacceptable video disc member having a thickness of plus two to minus five thousandths of an inch from a nominal value of forty-four thousandths of an inch over the information carrying portion of the video disc surface. Curve B shows the change in birefringence over the same region of the disc surface. This change in birefringence varies from a maximum of twenty-two to a minimum of two nanometers. It has been found that a video disc will only operate when the birefringence of the video disc is substantially uniform over the playing surface. Referring back to FIG. 13, the information carrying surface of the video disc lies between fifty-five millimeters and one hundred and fifty millimeters wherein the value of birefringence varies from a maximum of seven to a minimum of two. It has been found by experimental study that the video disc exhibiting the characteristics shown with reference to FIG. 13 is suitable for play on a video disc player as described in Elliott patent, U.S. Pat. No. 3,829,622 where the disc having the characteristics shown with reference to FIG. 14 does not perform satisfactorily on the same player.

Figure 10:
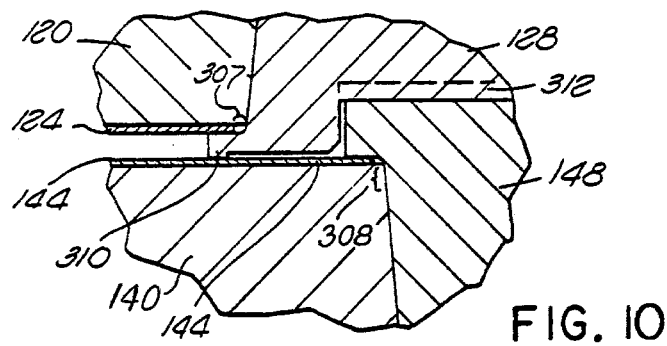
FIG. 10 is an enlarged sectional view of the area contained within the circle identified as 10 shown in FIG. 1.
Figure 11:
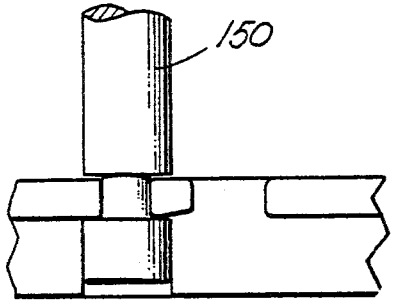
FIG. 11 is an enlarged sectional view of the area contained within the circle identified as 11 shown in FIG. 1.
Figure 12:
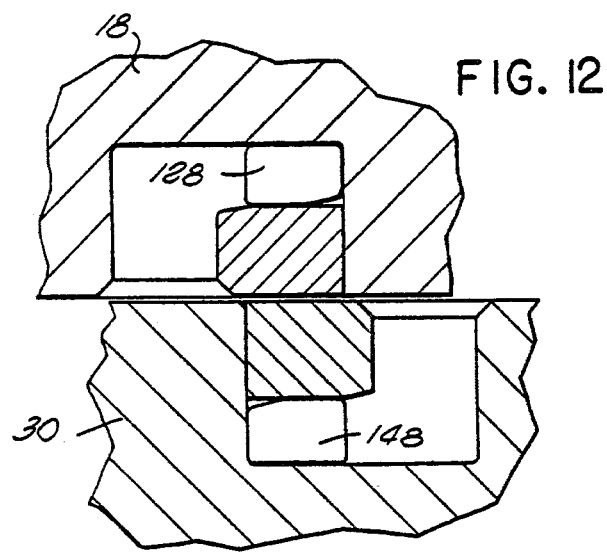
FIG. 12 is an enlarged sectional view taken along the line 12—12 of FIG. 1.

Referring to FIG. 10, there is shown the exploded view of that portion of FIG. 1 shown within the circle 10. The fixed outer stamper ring clamp is shown at 128 and the moving outer stamper ring clamp is shown at 148. The fixed platen is shown at 120 for holding the fixed stamper 124. The fixed stamper 124 terminates a distance from the moving fixed outer stamper ring clamp 128 as indicated by the length of the bracket 307. This allows the stamper 124 to expand outwardly until contact is made with the ring clamp 128. This expansion area for the fixed stamper 124 allows the stamper to expand as the heated material is injected into the video disc cavity.

The moving stamper 144 is held to the moving platen 140 by the moving outer stamper ring clamp 148. The fixed stamper 144 terminates at a point removed from the ring clamp 148 a distance as indicated by the bracket 308. A foot 310 of the fixed outer stamper ring clamp 128 helps to hold the moving stamper 144 in place yet allow the stamper 144 to expand through the distance as indicated by the bracket 308 in response to the heat from the injected molten material.

When the molten plastic is injected into the video disc cavity, it is important that the video disc have a substantially uniform thickness across the play area of the video disc as illustrated in FIG. 13. When the thickness of the video disc varies six thousandths of an inch, a non-playable disc results as illustrated in FIG. 14. When the thickness of the video disc is maintained within two thousandths of an inch as shown in FIG. 13, a playable disc results. It has been found that allowing the upper stamper and the lower stamper to expand in a horizontal direction as indicated by the brackets 307 and 308, a playable disc results because the stamper expands to fill these areas and does not buckle when subjected to the heat of the injected molten plastic material causing a variation in thickness of the video disc member. A passage 312 allows venting of the video disc cavity during the injection cycle.

The cooling system provided in the instant invention is calculated to remove heat from the tool 10 caused by the injection of molted plastic into the sprue passage and video disc cavity. Cooling prevents stress imperfections in the finished video disc record. The absence of stress imperfections improves the birefringence characteristic of the finished video disc record.

The cooling channels will be described with reference to FIGS. 1, 2, 7 and 8. Referring collectively to FIGS. 1 and 8, a sprue bushing cooling channel is shown at 350 having an entry valve at 352 and an exit valve at 354. As seen best in FIG. 1, the cooling channel 350 is spirally shaped and has four threads per inch extending from a position closer to the end 115 of the sprue passage 114 and extending down towards the end 117 of the sprue passage 114. The spiral then reverses itself back up the sprue bushing and exits from the exit valve 354. An O-ring is shown at 356 to provide a fluid tight connection between the sprue bushing cooling channel 350 and the sprue bushing lock ring 112.

Referring to FIG. 8, a fixed platen sprue region cooling channel is shown at 357 having an entrance valve at 358 and an exit valve at 359. The spiral shaped turn in the cooling channel 357 is represented by a single turn 357a shown in FIG. 8 at the center of the Figure. A fixed platen inner region cooling channel 360 is shown having an entrance valve at 362 and an exit valve at 364. The entrance point is at the inner radius and spirals out a plurality of turns before exiting the exit valve 364 for providing an inner cooling zone for the fixed platen. A fixed platen intermediate cooling channel is at 370 shown having its input valve at 372 and its exit valve at 374. The intermediate region cooling channel provides a second cooling zone to the fixed platen.

A fixed platen outer region cooling channel 380 has its input valve at 382 and its exit valve at 384. The fixed platen outer region cooling channel provides a further cooling zone to the fixed platen.

Figure 7:
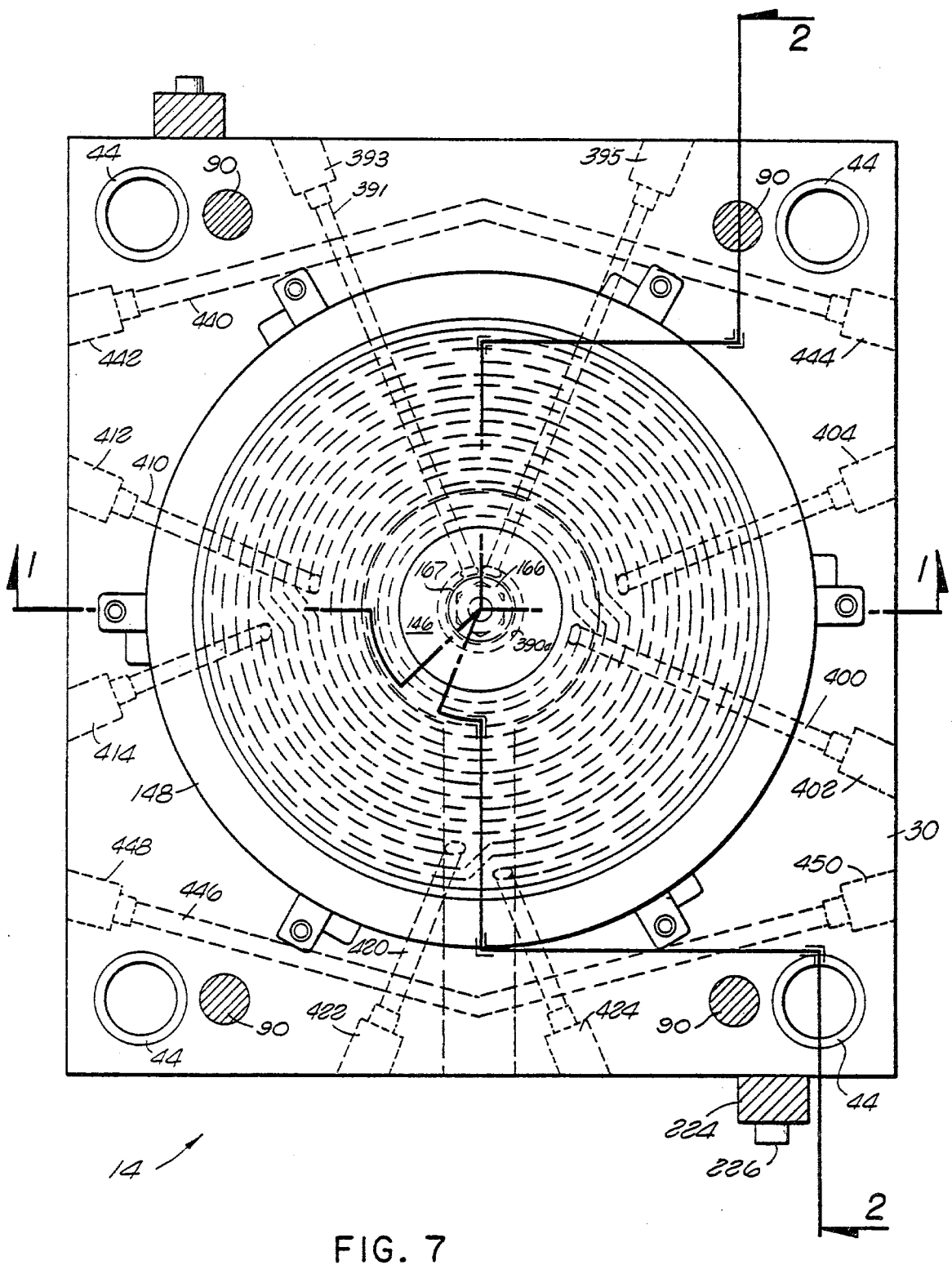
FIG. 7 is a plan view of the moving half shown in FIG. 1.
Figure 8:
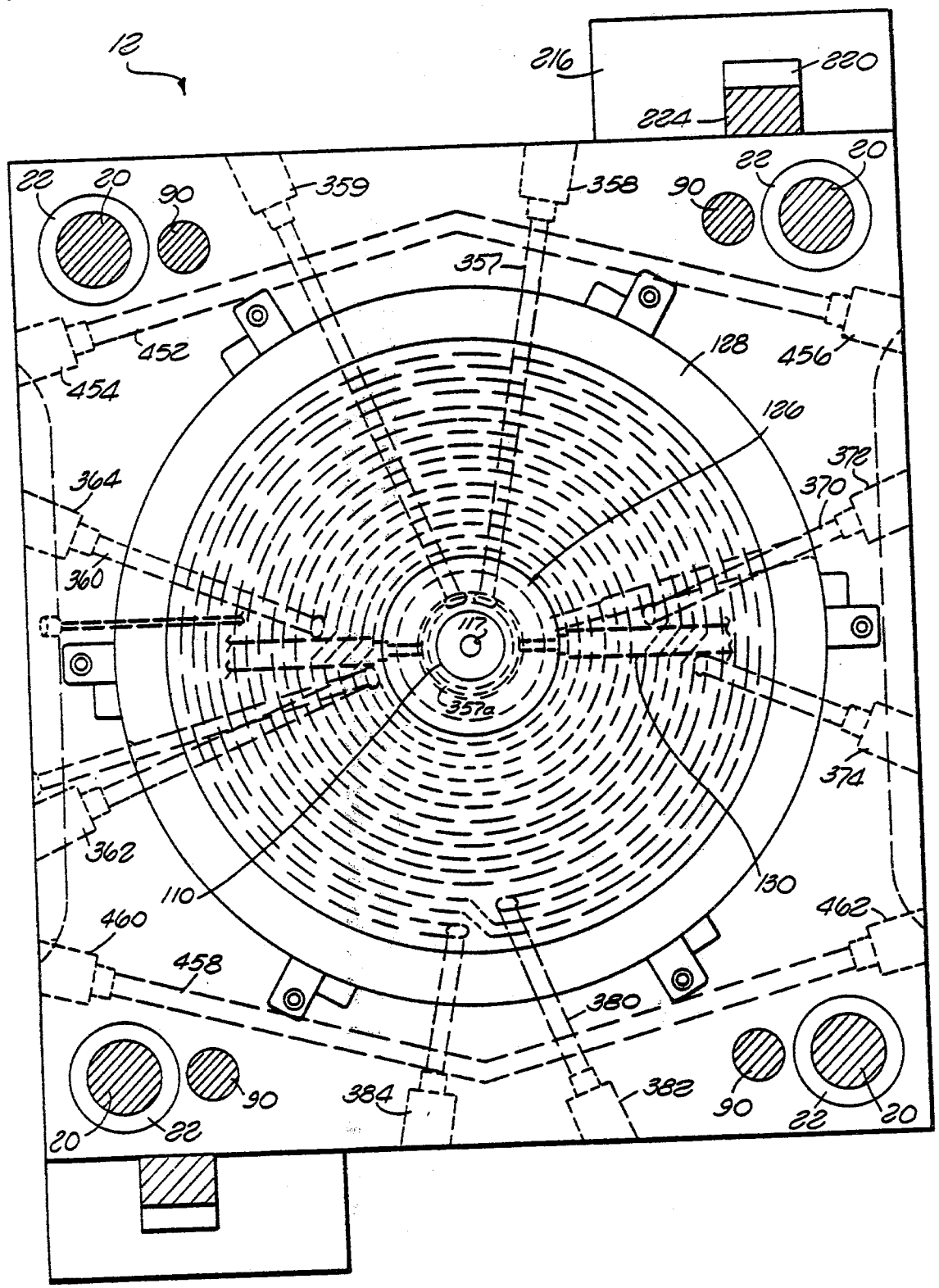
FIG. 8 is an inverted plan view of the fixed half of the mold assembly shown in FIG. 1.

Referring to FIGS. 2 and 7, there is shown a plurality of cooling zones associated with the moving mold half 14. A moving platen, punch region cooling channel is shown at 391 having an input valve at 393 and an exit valve at 395. This punch region cooling channel makes one turn around the punch region as shown at 390a with reference to FIG. 2 and then exits the exit valve at 395. The hottest portion of the tool 10 is at the sprue and punch region where the molten material enters from the injection molding machine.

A moving platen inner region cooling channel is shown at 400, having an input valve at 402 and an exit valve at 404. The moving platen inner region cooling channel makes a number of turns around the platen before exiting through the exit valve 404. The moving platen inner region cooling zone provides a further cooling zone for the moving platen. A moving platen intermediate region cooling channel 410 is shown having an input valve at 412 and an exit valve shown at 414. The moving platen intermediate region cooling channel provides a further cooling zone for the moving platen. A moving platen outer region cooling zone 420 is shown having its input valve at 422 and the output valve at 424. The moving platen outer region cooling channel provides for the cooling zone for the moving platen. Any suitable cooling fluid, including water, can be utilized in any one or all cooling zones.

Both the moving platen 140 and the fixed platen 120 are cored in the manner shown with reference to FIGS. 1 and 2 to provide for the plurality of cooling channels previously described. A pair of O-rings are provided at 366 and 368 to provide a fluid tight connection for the fixed platen sprue region cooling channel 357 of the fixed mold half 12. A second pair of O-rings are provided at 390 and 392 to provide a fluid tight connection for the plurality of cooling zones 360, 370 and 380 formed in the fixed platen 120. A further set of O-rings are provided at 394 and 396 to provide a fluid tight connection for the plurality of cooling zones 400, 410 and 420 formed in the moving platen 140. Another set of O-rings are provided at 430 and 432 to provide a fluid tight connection for the moving platen punch region cooling channel 391.

Referring to FIG. 7, the moving platen 140 includes a plurality of transverse cooling channels. A first moving platen transverse cooling channel is shown at 440 having its input valve at 442 and its exit valve at 444. A second moving platen transverse cooling channel is shown at 446 having its input valve at 448 and its exit valve at 450.

Referring to FIG. 8, the fixed platen 120 includes a plurality of transverse cooling channels. A first fixed platen transverse cooling channel is shown at 452 having its input valve at 454 and its exit valve at 456. A second fixed platen transverse cooling channel is shown at 458 having its input valve at 460 and its exit valve at 462.

It is important to note that a high degree of concentricity between the record spiral track and the record center hole is obtained because both operations, the formation of the spirally tracked record and punching of the sprue to define the record center hole, are performed in a single set-up. In the set-up, the inner surfaces on the stamper cooperate with the corresponding mating surfaces on the mold to obtain highly accurate positioning of the stamper on the mold. The outer surface of the stamper is allowed to float as previously discussed with reference to FIG. 10. Similarly, the punch peripheral surface which defines the record center hole is very precisely located relative to the mating surfaces on the fixed center stamper clamp 126. Since both the stamper, which forms the record spiral track, and the punch peripheral surface, which defines the record center hole, are very carefully aligned with respect to the mold, a high degree of cencentricity between the record spiral track and the record center hole is obtained.

What is claimed is:

1. In apparatus, for injection molding an article having a central aperture, having an injection nozzle for injecting a molten mixture into an annular cavity of uniform thickness formed by a first mold half and a second mold half, said injection gate being positioned intermediate the injection nozzle and the cavity, an injection gate comprising:
- a sprue passage of substantially circular cross-section and having a first end and a second end, and said first end being adapted to contact the injection nozzle and to receive a molten mixture exciting the injection nozzle;
- an annular shaped gate passage having a first end and a second end, and being formed by a plurality of concentric annular shaped sections positioned intermediate said second end of said sprue passage and said cavity;
- each of said sections having a different average thickness for regulating the pressure of the molten mixture as the mixture passes therethrough prior to entering the cavity; and
- said first end of said gate passage having a greater thickness than the second end of said gate passage for providing restriction to the passage of the molten material through said gate passage and for achieving a minimum disturbance to material flow of the molten material as it flows through said gate passage.

2. An injection gate as recited in claim 1 wherein the annular shaped gate passage further comprises:
- a first annular section having a first end and a second end and having a uniform radial length and having a gradually diminishing thickness across its radial length beginning at said first end and continuing to said second end, and said first end being positioned to receive the injected molten mixture from said sprue passage for providing a partial reservoir for said molten mixture as it abruptly leaves said sprue passage and for removing a portion of the stress carried within the molten mixture due to said abrupt change;
- a second annular section having a first end and a second end and having a uniform radial length and having a uniform thickness across its radial length, and said first end being positioned to receive the injected molten mixture from said second end of said first annular passage for providing a further reservoir for said molten mixture and for establishing a charge of said molten mixture of dimensional stability with the dimension of the cavity;
- a third annular section having a first end and a second end, and having a uniform radial length and having a gradually diminishing thickness across its radial length beginning at said first end and continuing to said second end, and said first end being positioned to receive the injected molten mixture from said second end of said second annular section for partially restricting the free flow of molten mixture from said reservoir section into the cavity for reducing stress forces in the molten mixture injected into said cavity; and
- a fourth annular section having a first end and a second end, and having a uniform radial length and having a uniform thickness across its radial length, and said first end being positioned to receive the injected molten mixture from said second end of said third annular section and said second end being positioned to inject said molten mixture into the cavity with minimum disturbance.

* * * * *